April 4, 1950
J. T. SPENCER
2,502,804
ARTICLE-HOLDING CLAMP HAVING A SELECTIVELY
RIGID OR SPRING-PRESSED JAW
Filed Nov. 8, 1944
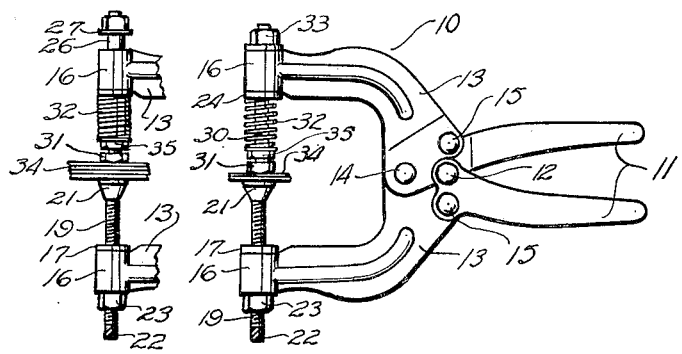
Fig. 2
Fig. 1
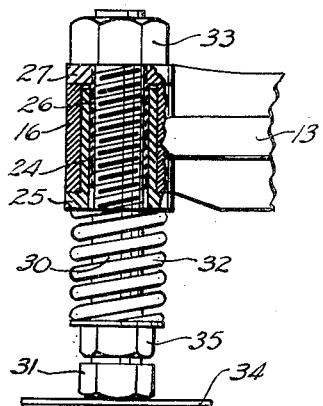
Fig. 3
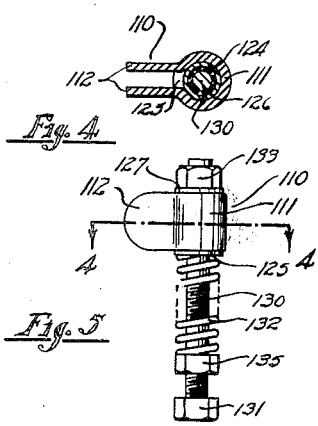
Fig. 4
Fig. 5
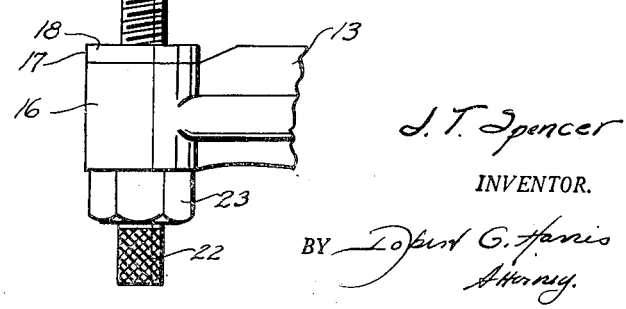
J. T. Spencer
INVENTOR.
BY Robert G. Harris
Attorney.

Patented Apr. 4, 1950

2,502,804

UNITED STATES PATENT OFFICE 2,502,804

ARTICLE-HOLDING CLAMP HAVING A SELECTIVELY RIGID OR SPRING-PRESSED JAW

John T. Spencer, Birmingham, Mich., assignor to Detroit Stamping Company, Detroit, Mich., a corporation of Michigan Application November 8, 1944, Serial No. 562,522

3 Claims. (Cl. 81—46)

This invention relates to clamping tools; and, more particularly, to an automatic pressure responsive work-engaging element to be used in toggle-operated tools and others which have the inherent property of being self-locking at a certain position of engagement.

Many tools have been devised employing the toggle principle and find their principal fields of use in assembly operations either as component parts of a jig or fixture—as with toggle clamps—or as individual clamping units—as with toggle pliers or toggle C clamps. Their main advantages are that they are readily engaged and disengaged from the work thereby speeding successive operations, they exert a considerable securing force with the application of a minimum of effort by the operator, and they will lock in a fixed position from which they may be released by operation of the handle alone and will not be disturbed by vibration or forces imposed on them at the work-engaging elements. It is in connection with this last characteristic that the present invention has its greatest value.

The locking position, of course, is reached just after the toggle pivots reach alignment as the work is engaged. Thus, to be effective, the work-engaging elements of the tool must be so set with respect to the thickness of the work to be engaged that this will occur just as the work is engaged with the requisite force. In a permanent setup employing, for example, toggle clamps, this is not difficult since each clamp is permanently fixed in a certain position at which the work (neglecting variations in thickness of the stock or component) always has the same thickness. However, when using toggle pliers or the like, the tool is loose and one time may be applied at one place on the work and at another time at another. Of course, if the work is of uniform thickness wherever engaged, there is no difficulty on this score. Notably in aircraft work (as in wing constructions) the thickness of the work varies markedly. Thus, in assembling wing surfaces built up of several thicknesses of metal, it is usual to clamp the laminae together adjacent their edges preliminary to riveting or welding them. But in this type of construction, the number of laminae will vary according to stress concentration along the extent of the wing and this is reflected in varying thickness of the work. If the conventional toggle device is used, each must be adjusted for a certain thickness of the workpiece and used each time at the selected location if the device is to lock into engagement. This is far from desirable and would result in considerable waste of time.

Somewhat similar conditions prevail where variations may be expected in the thickness of the stock itself—as in woodworking operations. This variation may be so great that the clamp will fail to engage the work and lock or may exert sufficient force on it (when the work is oversize) to mar the surface. Obviously, this condition can occur with either toggle clamps or toggle pliers. It is therefore necessary to provide some automatic means on the work-engaging element of the device to compensate for these differences in thickness of the workpiece (whether accidental or intentional) for insuring the application of the proper clamping pressure under all conditions. This is the function of the device of the present invention which is applied to a typical toggle tool and renders it applicable, without further adjustment, to work having a considerable range of thickness. It further controls the pressure which can be applied on the work thereby preventing marring or disfiguring it. Finally, it permits the tool to be locked under all these conditions, whether the variation arises from the design of the workpiece or from inaccuracies in the thickness of the stock or component. The construction is equally applicable to tools other than those employing the toggle linkage, but which have a fixed locking point.

With these and other considerations in view, the invention consists of the apparatus described in this specification, claimed in the claims, and illustrated in the accompanying drawings in which:

Figure 1 is an elevation of a toggle plier employing the invention shown, engaging a minimum thickness of stock at a particular adjustment.

Figure 2 is a corresponding view of the same pliers (a portion only being shown) in which the maximum thickness of stock at that adjustment is engaged.

Figure 3 is a partial elevation on an enlarged scale, one of the bosses being shown in section to illustrate the construction of the clamping means.

Figures 4 and 5 are an elevation and a section on the line 4—4, respectively, of the device of this invention constructed as an accessory unit for attachment to conventional clamps.

The pliers, shown generally at 10, comprise a pair of handles 11 pivotally secured to each other by the rivet 12, a pair of jaws 13 pivotally secured together by the rivet 14, and each handle being pivotally secured to its respective jaw by the rivets 15. This construction provides the toggle action. The handles 11 and the jaws 13 are preferably made each from two stampings welded together along their edges. These stampings, in the case of the jaws 13, are formed at their outer ends to provide a cylindrical housing 16 when the two parts are secured together. The lower cylindrical housing 16 slidably receives an internally threaded bushing 17 having a flange 18. Through this is threaded the bolt 19, terminating at its upper end in a ball 20 securing anvil 21, and at its lower end in a knurled knob 22. Thus the effective length of the bolt 19 with respect to the jaw 13 can be adjusted and locked in place by the nut 23.

The upper cylindrical housing 16 slidably receives the spring retainer 24 having the flange 25 which, in turn, slidably receives the tapped bushing 26 having the flange 27. The bolt 30 which is threaded its entire length to the head 31, carries the spring 32 and is engaged through the tapped bushing 26 and locked in position therein by the nut 33. A second nut 35 is also threaded on the bolt 30 and may be adjusted therealong to vary the effective spring pressure between the bolt assembly and the retainer 24. Thus the bolt 30 will be urged downwardly by the spring 32, although its lowest position is governed by the flange 27, engaging the upper surface of the housing 16. When pressure is applied upwardly on the bolt 30 (as by engagement of the workpiece 34) the bolt has a limited vertical movement through the resiliency of the spring 32, the tapped bushing 26 sliding within the spring retainer 24. Thus, as shown in Figure 2, the clamp may attain a locking position when four plies of stock constitute the workpiece as well as when but two plies are involved as in Figure 1. This resiliency may be adjusted within a small range by taking up on the nut 35 or over a wider range by substituting other springs having different deflection characteristics. Thus, also, the force applied may be governed, particularly when working with wood or the softer metals, so as to prevent marring of the surface of the workpiece. Further, if a rigid locking clamp is desired, the position of the tapped bushing 26 can be reversed with its flange 27 abutting the retainer flange 25 and the bolt 30 then threaded through it.

The device may also be manufactured as a complete unit for attachment to conventional clamps to convert them to adjustable pressure clamps. One such unit 110 is shown in Figures 4 and 5. The same mechanism described above is mounted in a cylindrical clip 111 having a pair of extending parallel ears 112. The bar of a clamp can be slipped between these ears and welded to them. The unit includes the spring retainer 124 with a flange 125 and the tapped bushing 126 with a flange 127. The bolt 130 is threaded through the bushing 126 and associated with it are the head 131, the spring 132, the lock nut 133 and the spring-adjusting nut 135.

Apart from the advantages in use of the tool, the construction shown has particular value in tools built up from stampings. By using tapped bushings which merely slide into the jaw housings, accuracy of assembly and economy of manufacture is possible. The flanges on the bushings insure accurate alignment and a proper distribution of stresses. The entire device is self-sustaining without requiring set screws or other locking means. The bolt 19, the bushing 17, and anvil 21 are held in place by the nut 23 which provides both a means of adjustment and a retainer to secure the component in the housing 16. The spring 32 keeps the spring retainer 24 in the upper housing 16 and, with the nut 33, keeps the tapped bushing 26 and bolt 30 in slidable engagement as well as permitting their adjustment. The tool is easily assembled and as easily knocked down to change springs or work-engaging heads when this is required. Yet the construction is rigid and sturdy; and, since it is made from stampings, lighter than comparable devices made from castings. In operation, the device is entirely automatic either for locking workpieces of varying thickness or metering the force to be applied thereto.

Certain changes may be made in the construction disclosed without departing from the function of the invention and it is the intention to cover by the claims such variations as are reasonably included therein.

The invention claimed is:

1. In a tool of the class described, a work support, a toggle linkage secured to said work support and including an element extending therefrom, said linkage being self-locking in a predetermined closed position of said element, said element terminating in a cylindrical housing axially aligned with said support, a bushing having an enlarged flange inserted within said housing with said flange toward said support, a tapped bushing having an enlarged flange slidably received in said first bushing with said second flange on the side of the housing opposite said first flange, a work engaging means comprising a headed bolt threaded in said tapped bushing in alignment with said work support and the head thereof adapted to cooperate with said work support to engage a workpiece therebetween, a spring means in the form of a coil surrounding said bolt and interposed between said bolt head and the exposed outer surface of said first flange resiliently urging said bolt head away from said first flange, whereby the position of said work-engaging means with respect to said element may be automatically varied to accommodate work-pieces of varying thickness between said support and said engaging means while permitting said element to attain said self-locking position.

2. In a tool of the class described, a toggle plier comprising a pair of handles pivoted to each other, a pair of jaws pivoted to each other and one to each of said handles, said jaws terminating at their outer ends in aligned cylindrical housings, a work support in one said housing, a work-engaging means in the other said housing, said work engaging means comprising a first bushing received in said other housing and having an enlarged flange bearing against the edge of said other housing facing said work support, a tapped bushing slidably received in said first bushing and having an enlarged flange normally bearing against the opposite edge of said other housing, a bolt threaded through said tapped bushing having its head facing said work support, and a coil spring surrounding said bolt and interposed between said head and the exposed outer surface of the flange of said first bushing.

3. In a tool of the class described, a substantially cylindrical housing, a cylindrical bushing slidably mounted in said housing and having an exterior circumferential flange bearing against the base of said housing, a tapped cylindrical bushing having an exterior circumferential flange and adapted to be slidably received within said first bushing, a headed bolt having a working surface and threadedly engaging said tapped bushing and extending therethrough, said tapped bushing in one position being mounted in said first bushing with its flange on the side of the housing remote from said flange on said first bushing and a coil spring surrounding said bolt and interposed between the outer surface of the flange on said first bushing and said working surface permitting limited movement of said working surface toward said housing, said tapped bushing being axially reversible to another position in said first bushing with its flange abutting said flange on said first bushing prohibiting movement of said working surface toward said housing, said housing including spaced parallel extending ears to permit attachment thereof as a unit to a toggle-operated clamp mechanism.

JOHN T. SPENCER.

REFERENCES CITED

The following references are of record in the file of this patent:

UNITED STATES PATENTS

| Number | Name | Date |
|---|---|---|
| 914,041 | Hall | Mar. 2, 1909 |
| 1,930,384 | Dressen | Oct. 10, 1933 |
| 2,296,162 | Hanson et al. | Sept. 15, 1942 |
| 2,316,073 | Kellogg | Apr. 6, 1943 |
| 2,322,107 | Balcar | June 15, 1943 |
| 2,323,654 | Gordy et al. | July 6, 1943 |
| 2,327,368 | Olson | Aug. 24, 1943 |